(12) United States Patent
Choi et al.

(10) Patent No.: US 11,075,035 B2
(45) Date of Patent: Jul. 27, 2021

(54) MULTILAYERED CAPACITOR

(71) Applicant: SAMSUNG ELECTRO-MECHANICS CO., LTD., Suwon-si (KR)

(72) Inventors: Du Won Choi, Suwon-si (KR); Ji Hong Jo, Suwon-si (KR); Seok Kyoon Woo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 43 days.

(21) Appl. No.: 16/365,076

(22) Filed: Mar. 26, 2019

(65) Prior Publication Data
US 2020/0194177 A1 Jun. 18, 2020

(30) Foreign Application Priority Data

Dec. 17, 2018 (KR) ........................ 10-2018-0162902

(51) Int. Cl.
*H01G 4/224* (2006.01)
*H01G 4/30* (2006.01)
(Continued)

(52) U.S. Cl.
CPC ............ *H01G 4/224* (2013.01); *H01G 4/2325* (2013.01); *H01G 4/30* (2013.01); *H01G 4/012* (2013.01)

(58) Field of Classification Search
CPC .......... H01G 4/232; H01G 4/228; H01G 4/30; H01G 4/224
See application file for complete search history.

(56) References Cited

U.S. PATENT DOCUMENTS

2012/0229951 A1  9/2012  Kim
2015/0170786 A1  6/2015  Hong et al.
(Continued)

FOREIGN PATENT DOCUMENTS

JP   2002-184648 A      6/2002
JP   2008071926 A   *  3/2008   ........... H01G 4/2325
(Continued)

OTHER PUBLICATIONS

Translation of JP 2008-071926 (Year: 2008).*

*Primary Examiner* — Eric W Thomas
(74) *Attorney, Agent, or Firm* — Morgan, Lewis & Bockius LLP

(57) ABSTRACT

A multilayer capacitor includes: a capacitor body including dielectric layers and first and second internal electrodes, and having first to six external surfaces, wherein the first internal electrode is exposed through the third, fifth, and sixth external surfaces, and the second internal electrode is exposed through the fourth, fifth, and sixth external surfaces; first and second side portions; and first and second external electrodes including first and second sintered electrodes, and first and second conductive resin electrodes, respectively, wherein $\delta L/T < 3.5\%$ is satisfied, where L is a thickness of the first or second side portion, taken at a level at which the first or second internal electrode is disposed, $\delta L$ is a difference between a maximum L value and a minimum L value, and T is a length of the first or second side portion in a direction perpendicular to the first and second internal electrodes.

14 Claims, 5 Drawing Sheets

(51) Int. Cl.
*H01G 4/232* (2006.01)
*H01G 4/012* (2006.01)

(56) References Cited

U.S. PATENT DOCUMENTS

2017/0018363 A1\* 1/2017 Tanaka ..................... H01G 4/30
2018/0090276 A1\* 3/2018 Ito ......................... H01G 4/232
2019/0164693 A1\* 5/2019 Ono ....................... H01G 4/012
2019/0180935 A1\* 6/2019 Kato ...................... H01G 4/012

FOREIGN PATENT DOCUMENTS

KR  10-2012-0103522 A  9/2012
KR  10-2015-0068622 A  6/2015

\* cited by examiner

MULTILAYERED CAPACITOR

CROSS-REFERENCE TO RELATED APPLICATIONS

This application claims the benefit of priority to Korean Patent Application No. 10-2018-0162902 filed on Dec. 17, 2018 in the Korean Intellectual Property Office, the entirety of which is incorporated herein by reference.

BACKGROUND

1. Field

The present disclosure relates to a multilayer capacitor.

2. Description of Related Art

Multilayer capacitors may be compact in size while having high capacitance, and thus have been widely used in various electronic devices.

In recent years, such multilayer capacitors have been more extensively used even in automotive components, as well as in information technology (IT) products, and particularly, components used in automotive products are often subjected to severe operating conditions, and thus require high reliability.

Accordingly, as electronic control systems for vehicles with an internal combustion engine and electric cars have been increasingly utilized, there has been increasing demand for a multilayer capacitor that can be used as an automotive component in a high-temperature environment.

Furthermore, since it is reasonably anticipated that new markets will emerge for compact-size high-capacitance multilayer ceramic capacitors that can be mounted in an autonomous driving system, it is necessary to develop technology that can accommodate such needs.

The information disclosed in this Background of the Invention section is only for enhancement of understanding of the general background of the invention and may not be taken as an acknowledgement or any form of suggestion that this information forms the prior art already known to a person skilled in the art.

SUMMARY

Various aspects of the present invention are directed to providing a multilayer capacitor capable of improving capacitance and ensuring a certain level of humidity resistance reliability in a high-temperature environment.

According to an aspect of the present disclosure, a multilayer capacitor may include: a capacitor body including a plurality of dielectric layers and a plurality of first and second internal electrodes alternately disposed with dielectric layer interposed therebetween, and having first and second external surfaces opposing each other, third and fourth external surfaces connected to the first and second external surfaces and opposing each other, and fifth and sixth external surfaces connected to the first and second external surfaces, connected to the third and fourth external surfaces, and opposing each other, wherein the first internal electrode is exposed through the third, fifth, and sixth external surfaces, and the second internal electrode is exposed through the fourth, fifth, and sixth external surfaces; first and second side portions respectively disposed on the fifth and sixth external surfaces of the capacitor body; and first and second external electrodes respectively disposed on the third and fourth external surfaces of the capacitor body, including first and second sintered electrodes respectively disposed in contact with the first and second internal electrodes, and including first and second conductive resin electrodes respectively disposed on the first and second sintered electrodes, wherein $\delta L/T<3.5$ is satisfied, where L is a thickness of the first or second side portion, taken at a level at which the first or second internal electrode is disposed, $\delta L$ is a difference between a maximum L value and a minimum L value, and T is a length of the first or second side portion in a direction perpendicular to the first and second internal electrodes.

In an exemplary embodiment of the present disclosure, an average value of L may be greater than or equal to 48 μm.

In an exemplary embodiment of the present disclosure, the first internal electrodes may be exposed through a corner connecting the third external surface and the fifth external surface of the capacitor body and through a corner connecting the third external surface and the sixth external surface of the capacitor body, while the second internal electrodes may be exposed through a corner connecting the fourth external surface and the fifth external surface of the capacitor body and through a corner connecting the fourth external surface and the sixth external surface of the capacitor body.

In an exemplary embodiment of the present disclosure, an average thickness of the first and second internal electrodes may be less than 1 μm.

In an exemplary embodiment of the present disclosure, an average thickness of the dielectric layers may be less than three times the average thickness of the first and second internal electrodes.

In an exemplary embodiment of the present disclosure, a distance from the third external surface of the capacitor body to an end portion of the first conductive resin electrode may be shorter than a distance from the third external surface of the capacitor body to an end portion of the first sintered electrode, while a distance from the fourth external surface of the capacitor body to an end portion of the second conductive resin electrode may be shorter than a distance from the fourth external surface of the capacitor body to an end portion of the second sintered electrode.

In an exemplary embodiment of the present disclosure, the first external electrode may include a first connection portion 130a disposed on the third external surface of the capacitor body and connected to the first internal electrode, and a first band portion 130b extending onto portions of the first and second external surfaces of the capacitor body from the first connection portion 130a, while the second external electrode may include a second connection portion 140a disposed on the fourth external surface of the capacitor body and connected to the second internal electrode, and a second band portion 140b extending onto portions of the first and second external surfaces of the capacitor body from the second connection portion.

In an exemplary embodiment of the present disclosure, the first external electrode may further include a first plating layer covering the first conductive resin electrode, while the second external electrode may further include a second plating layer covering the second conductive resin electrode.

In an exemplary embodiment of the present disclosure, the first plating layer may include a first nickel layer covering the first conductive resin electrode and a first tin layer covering the first nickel layer, while the second plating layer may include a second nickel layer covering the second conductive resin electrode and a second tin layer covering the second nickel layer.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF DRAWINGS

The above and other aspects, features, and advantages of the present disclosure will be more clearly understood from the following detailed description, taken in conjunction with the accompanying drawings, in which.

Figure 1:
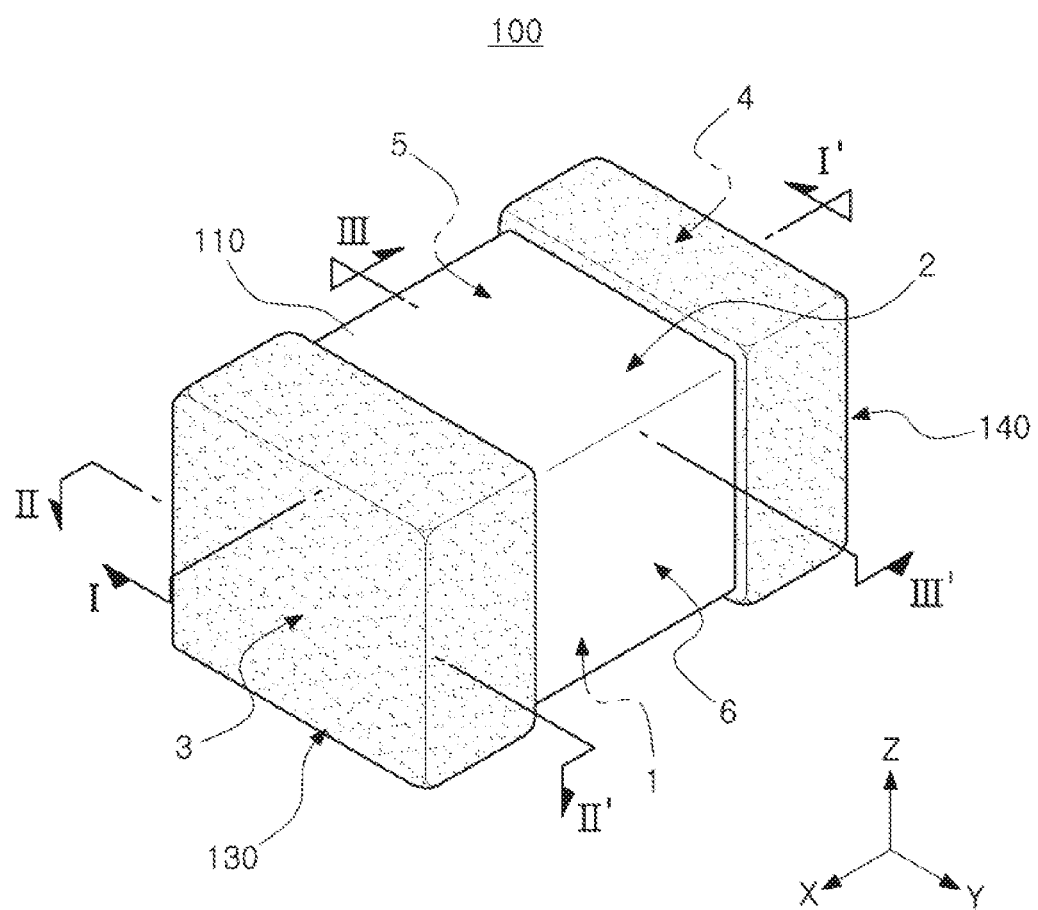
FIG. 1 is a schematic perspective view illustrating a multilayer capacitor according to an exemplary embodiment of the present disclosure.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present disclosure will now be described in detail with reference to the accompanying drawings.

The present disclosure may, however, be exemplified in various forms and should not be construed as being limited to the specific embodiments set forth herein.

Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, like reference numerals denote parts performing similar functions and actions throughout the drawings.

In addition, unless explicitly described otherwise, "comprising" any components will be understood to imply the inclusion of other components but not the exclusion of any other components.

For ease of explanation in describing the present exemplary embodiment, X, Y, and Z, defining directions of a multilayer capacitor and an electronic component illustrated in the drawings indicate a length direction, a width direction, and a thickness direction, respectively.

Here, direction Z may be a stacking direction in which dielectric layers are stacked.

Figure 2:
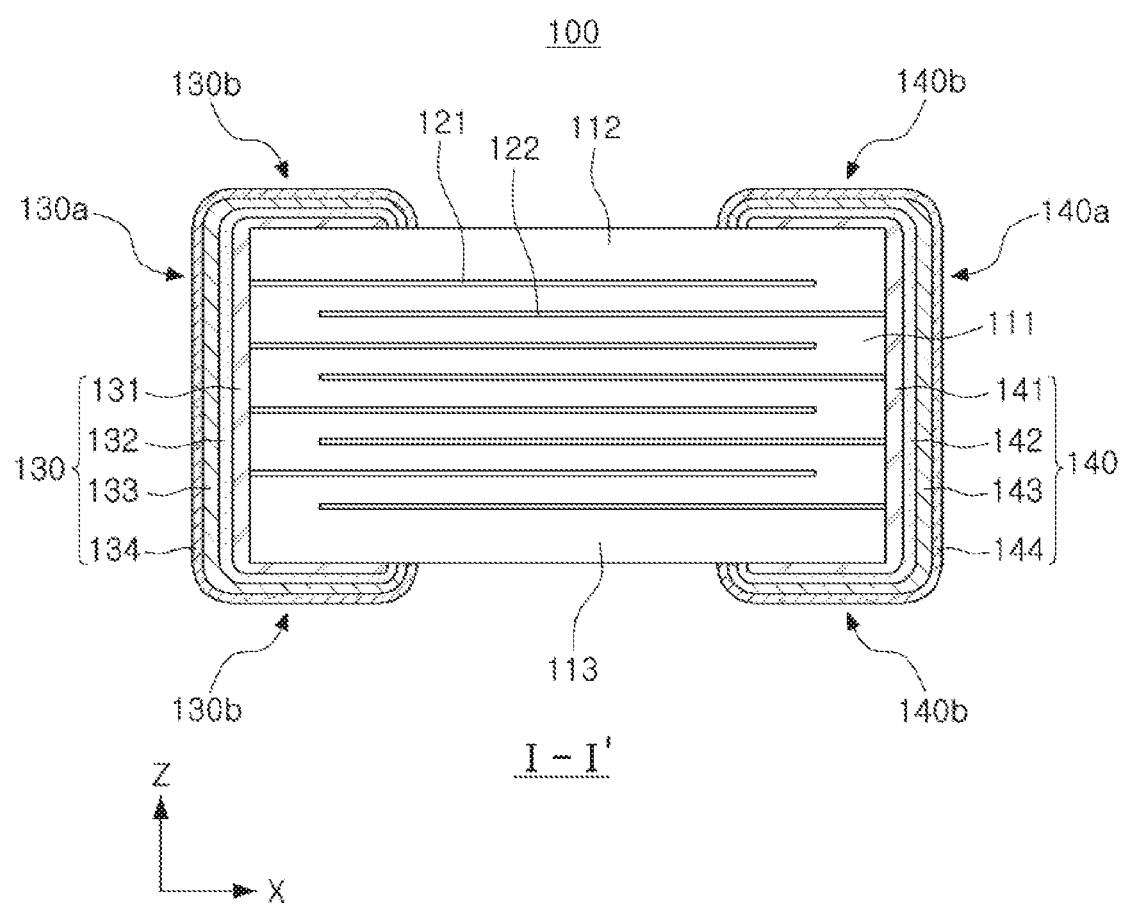
FIG. 2 is a cross-sectional view taken along line I-I' of FIG. 1.
Figure 3A:
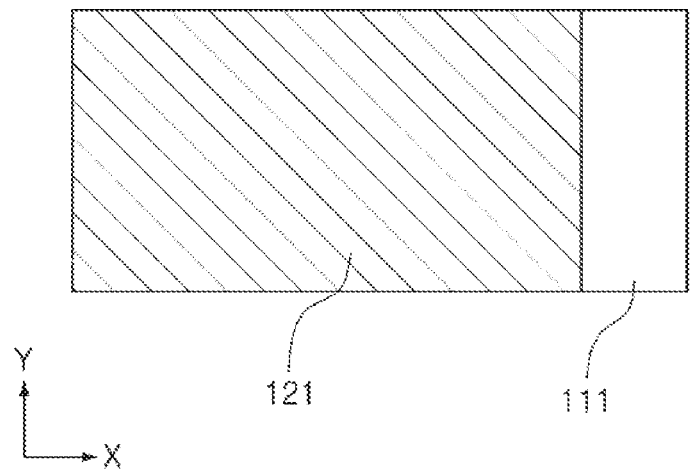
FIG. 3A and FIG. 3B are plan views illustrating first and second internal electrodes, respectively, applied to a multilayer capacitor of FIG. 1.
Figure 3B:
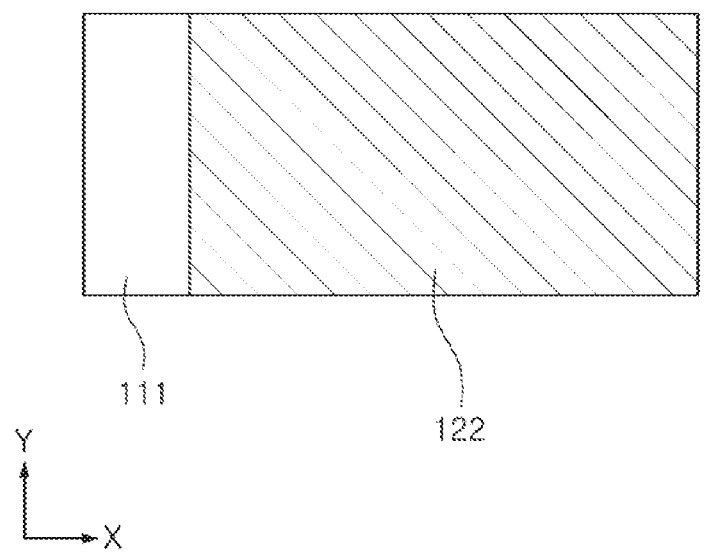
Figure 4:
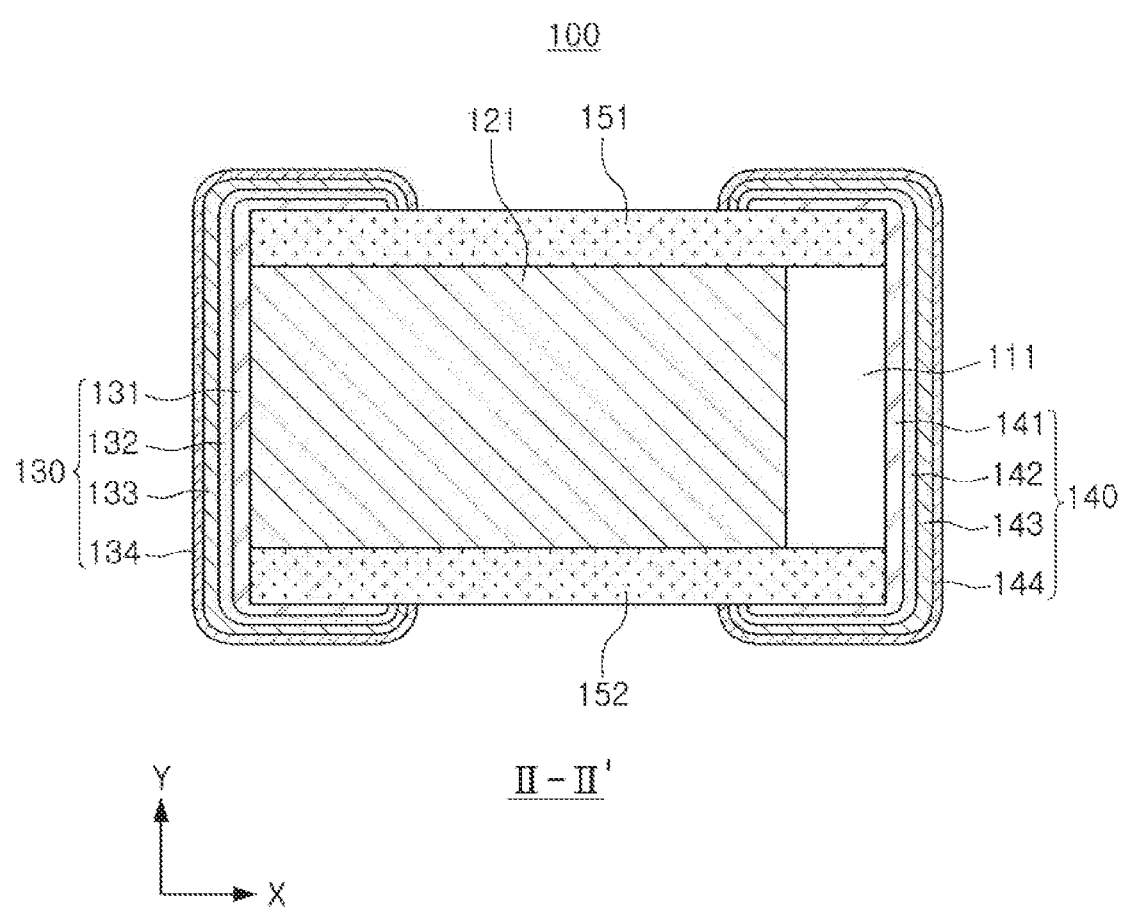
FIG. 4 is a cross-sectional view taken along line II-IF of FIG. 1.
Figure 5:
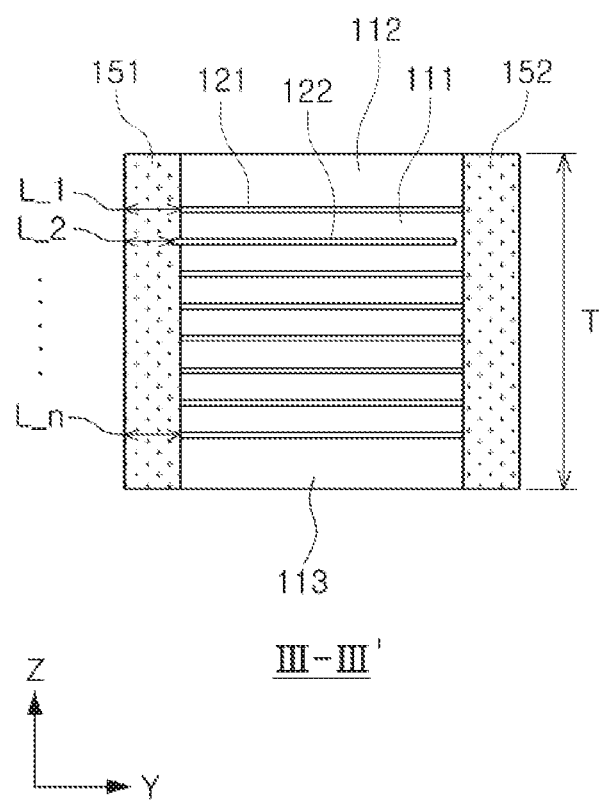
FIG. 5 is a cross-sectional view taken along line of FIG. 1.

FIG. 1 is a perspective view schematically illustrating a multilayer capacitor according to an exemplary embodiment of the present disclosure; FIG. 2 is a cross-sectional view taken along line I-I' of FIG. 1; FIG. 3A and FIG. 3B are plan views illustrating first and second internal electrodes, respectively, applied to a multilayer capacitor of FIG. 1; FIG. 4 is a cross-sectional view taken along line II-IF of FIG. 1; and FIG. 5 is a cross-sectional view taken along line of FIG. 1.

Hereinbelow, referring to FIG. 1 to FIG. 5, a multilayer capacitor of the present exemplary embodiment will be described.

Referring to FIG. 1 to FIG. 5, a multilayer capacitor 100 of the present exemplary embodiment includes a capacitor body 110, first and second side portions 151 and 152, and first and second external electrodes 130 and 140.

The capacitor body 110 is formed by stacking a plurality of dielectric layers 111 in direction Z and sintering the same, wherein adjacent dielectric layers 111 may be integrated with each other, such that boundaries therebetween may be difficult to identify without using a scanning electron microscope (SEM).

In addition, the capacitor body 110 includes the plurality of dielectric layers 111, and first and second internal electrodes 121 and 122 having different polarities from each other, and alternately disposed in direction Z with the dielectric layers 111 interposed therebetween.

In addition, the capacitor body 110 may include an active region, serving as a part contributing to formation of capacitance of a capacitor, and cover regions 112 and 113 as margin portions, disposed in upper and lower portions of the active region in direction Z, respectively.

The capacitor body 110 is not particularly limited in terms of shape and may have a hexahedral shape, and may include first and second external surfaces 1 and 2 facing each other in direction Z, third and fourth external surfaces 3 and 4 connected to the first and second external surfaces 1 and 2 and opposing each other in direction X, and fifth and sixth external surfaces 5 and 6 connected to the first and second external surfaces 1 and 2, connected to the third and fourth external surfaces 3 and 4, and opposing each other.

The dielectric layers 111 may include a ceramic powder, for example, $BaTiO_3$-based ceramic powder, or the like.

The $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, obtained by partially employing calcium (Ca) or zirconium (Zr) in $BaTiO_3$, but the present disclosure is not limited thereto Also, in addition to the ceramic powder, the dielectric layers 111 may further include a ceramic additive, an organic solvent, a plasticizer, a binder, a dispersant, or the like.

Here, the ceramic additive may include a transition metal oxide or carbide, rare earth elements, magnesium (Mg), aluminum (Al), or the like.

The first and second internal electrodes 121 and 122 are electrodes having different polarities from each other, and may be disposed on the dielectric layers 111 and stacked in direction Z. The first and second internal electrodes 121 and 122 may be alternately disposed along direction Z inside the capacitor body 110 with one dielectric layer 111 interposed therebetween while facing each other.

Here, the first and second internal electrodes 121 and 122 may be electrically insulated from each other by the dielectric layer 111 disposed therebetween.

Although the present disclosure is described by illustrating a structure in which the internal electrodes are stacked in direction Z, the present disclosure is not limited thereto, and if necessary, may be adapted to a structure in which the internal electrodes are stacked in direction Y.

Also, the first internal electrode 121 may be exposed through the third, fifth, and sixth external surfaces 3, 5, and 6 of the dielectric layers 111, wherein the first internal electrode 121 may be also exposed through a corner connecting the third external surface 3 and the fifth external surface 5 of the capacitor body 110 and through a corner connecting the third external surface 3 and the sixth external surface 6 of the capacitor body 110.

Also, the second internal electrode 122 may be exposed through the fourth, fifth, and sixth external surfaces 4, 5, and 6 of the dielectric layers 111, wherein the second internal electrode 122 may be also exposed through a corner connecting the fourth external surface 4 and the fifth external surface 5 of the capacitor body 110 and through a corner connecting the fourth external surface 4 and the sixth external surface 6 of the capacitor body 110.

Here, end portions of the first and second internal electrodes 121 and 122, alternately exposed through the third and fourth external surfaces 3 and 4, may be connected to and thereby electrically connected to the first and second external electrodes 130 and 140, disposed on each end portion of the capacitor body 110 in direction X, as will be described later.

Through the above configuration, when a predetermined voltage is applied to the first and second external electrodes 130 and 140, charges are accumulated between the first and second internal electrodes 121 and 122.

Here, capacitance of the multilayer capacitor 100 is proportional to an area of overlap of the first and second internal electrodes 121 and 122 overlapping each other along direction Z inside the active region.

Since the first and second internal electrodes 121 and 122, when configured as shown in the present exemplary embodiment, may not only enlarge base areas of the first and second internal electrodes 121 and 122, but also increase an area in which the first and second internal electrodes 121 and 122 vertically overlap each other, capacitance of the multilayer capacitor 100 may be effectively improved.

Also, the material forming the first and second internal electrodes 121 and 122 is not particularly limited, and for example, the first and second internal electrodes 121 and 122 may be formed by using a conductive paste containing at least one of a noble metal material, nickel (Ni), and copper (Cu).

As the method for printing the conductive metal, a screen printing method or a Gravure printing method may be used, but the present disclosure is not limited thereto.

Also, an average thickness of the first and second internal electrodes 121 and 122 in Z direction may be less than 1 μm.

Also, in the present exemplary embodiment, an average thickness of the dielectric layers 111 in Z direction may be less than three times the average thickness of the first and second internal electrodes 121 and 122.

The first side portion 151 is disposed on the fifth external surface 5 of the capacitor body 110, while the second side portion 152 is disposed on the sixth external surface 6 of the capacitor body 110, such that the first and second side portions 151 and 152 are in contact with front ends of portions of the first and second internal electrodes 121 and 122, respectively, the portions exposed through the fifth and sixth external surfaces 5 and 6 of the capacitor body 110, respectively.

The first and second side portions 151 and 152 may serve to protect the capacitor body 110 and the first and second internal electrodes 121 and 122 from external impacts and the like, and may serve to secure insulating properties and humidity resistance reliability around the capacitor body 110.

Here, the relationship $\delta L/T < 3.5\%$ may be satisfied, where L is a thickness of the first or second side portion 151 or 152 along direction Y, taken at a level at which the first or second internal electrode 121 or 122 is disposed; $\delta L$ is a difference between a maximum L value and a minimum L value; and T is a length of the first or second side portion 151 or 152 along direction Z, perpendicular to the first and second internal electrodes 121 and 122. Here, L can be measured by horizontally extending the first or second internal electrode 121 or 122 from a point at which the first or second internal electrode 121 or 122 terminates.

When $\delta L/T$ is greater than or equal to 3.5%, a step portion may be formed on upper and lower external surfaces of the first and second side portions 151 and 152, and in a relatively small multilayer capacitor, this may cause an undesirable decrease in the area of internal electrodes for forming capacitance, thus making it difficult to secure a capacitance targeted in product design, and this may cause degradation in electrical characteristics and reliability of a multilayer capacitor.

Accordingly, in order to reduce step portion formation and secure capacitance even in a small multilayer capacitor, to thus ensure electrical characteristics and reliability of the multilayer capacitor 100, $\delta L/T$ should be less than 3.5%.

Also, an average value of thicknesses of the first and second side portions 151 and 152 in direction Y may be greater than or equal to 48 μm.

When the mean value of thicknesses of the first and second side portions 151 and 152 is less than 48 μm, insulating properties may degrade, thus degrading reliability and giving rise to Joule heating due to a direct current, and this may form burnt cracks and cause breakage in the multilayer capacitor 100 in a humidity resistance testing environment in which a pressure is applied.

Accordingly, in order to secure a certain level of insulating properties and prevent formation of burnt cracks and breakage, the average value of thicknesses of the first and second side portions 151 and 152 should be greater than or equal to 48 μm.

The first and second external electrodes 130 and 140 are provided with different polarities from each other, and may be respectively disposed on opposite end portions of the capacitor body 110 in direction X, and may be disposed in contact with portions of the first and second internal electrodes 121 and 122, the portions being respectively exposed through the third and fourth external surfaces 3 and 4 of the capacitor body 110, to be electrically connected to the first and second internal electrodes 121 and 122, respectively.

The first external electrode 130 may include a first connection portion 130a and a first band portion 130b.

The first connection portion 130a is disposed on the third external surface 3 of the capacitor body 110, and is disposed in contact with an end portion of the first internal electrode 121, which is externally exposed through the third external surface 3 of the capacitor body 110, to physically and electrically connect the first internal electrode 121 and the first external electrode 130 to each other.

The first band portion 130b is a part extended to portions of the first and second external surfaces 1 and 2 of the capacitor body 110 from the first connection portion 130a, for improving adhesion strength the like. Here, if necessary, the first band portion 130b may be formed to extend onto the fifth and sixth external surfaces 5 and 6 of the capacitor body 110 to cover one end portions of the first and second side portions 151 and 152.

The second external electrode 140 may include a second connection portion 140a and a second band portion 140b.

The second connection portion 140a is disposed on the fourth external surface 4 of the capacitor body 110, and is disposed in contact with an end portion of the second internal electrode 122, which is externally exposed through the fourth external surface 4 of the capacitor body 110, to physically and electrically connect the second internal electrode 122 and the second external electrode 140 to each other.

The second band portion 140b is a part extended to portions of the first and second external surfaces 1 and 2 of the capacitor body 110 from the second connection portion, for improving adhesion strength the like. Here, if necessary, the second band portion 140b may be formed to extend onto the fifth and sixth external surfaces 5 and 6 of the capacitor body 110 to cover the other end portions of the first and second side portions 151 and 152.

In the present exemplary embodiment, the first and second external electrodes 130 and 140 may include first and second sintered electrodes 131 and 141, respectively, the first and second sintered electrodes containing at least one metal component selected among copper (Cu), nickel (Ni), and the like.

Also, on top of the first and second sintered electrodes 131 and 141, the first and second conductive resin electrodes 132 and 142 are formed to cover the first and second sintered electrodes 131 and 141.

Here, a distance from the third external surface 3 of the capacitor body 110 to an end portion of the first conductive resin electrode 132 disposed on the fifth or sixth external surface 5 or 6 of the capacitor body 110 may be shorter than a distance from the third external surface 3 of the capacitor body 110 to an end portion of the first sintered electrode 131 disposed on the fifth or sixth external surface 5 or 6 of the capacitor body 110.

Also, a distance from the fourth external surface 4 of the capacitor body 110 to an end portion of the second conductive resin electrode 142 disposed on the fifth or sixth external surface 5 or 6 of the capacitor body may be shorter than a distance from the fourth external surface 4 of the capacitor 110 to an end portion of the second sintered electrode 141 disposed on the fifth or sixth external surface 5 or 6 of the capacitor body 110.

Also, the first and second external electrodes 130 and 140 may include first and second plating layers, respectively, the first and second plating layers formed on external surfaces of the first and second conductive resin electrodes 132 and 142, respectively.

The first and second plating layers may include the first and second nickel plating layers 133 and 143, respectively, which cover the first and second conductive resin electrodes 132 and 142, respectively, and may include the first and second tin (Sn) plating layers 134 and 144, respectively, which cover the first and second nickel plating layers 133 and 143, respectively.

Typically, conventional multilayer capacitors used in automotive applications, such as in vehicles, are large in size and low in capacitance, and yet require high reliability.

However, as increasingly more electric devices are mounted inside a vehicle, and since in a 5G environment, automatic driving may be possible using real-time communications, there has been demand for a control device to be mounted inside the vehicle.

In the above context, although it is necessary to reduce the size of a multilayer capacitor while increasing the capacitance thereof, currently available multilayer capacitors are relatively large in size, and due to technical limitations, can be reduced in size only to a limited extent.

The multilayer capacitor of the present exemplary embodiment has a structure having no margin portion in a width direction (direction Y) in dielectric layers, so even when the overall size of the multilayer capacitor is reduced, it is possible to increase capacitance thereof, and the thicknesses and heights of side portions may be delimited to ensure a certain level of humidity resistance reliability in high-temperature environments.

Hereinbelow, tests carried out for confirming capacitance loss according to δL/T values in a multilayer capacitor of the present disclosure will be described.

In Table 1, changes in capacitance loss according to changes in δL/T were investigated, where a capacitance loss less than 4.2% was evaluated as a pass.

TABLE 1

| Sample # | δL/T (%) | T (mm) | Capacitance Loss |
|---|---|---|---|
| 1 | 2.4 | 0.3 | 3.6% |
| 2 | 3.5 | 0.3 | 5.2% |
| 3 | 4.6 | 0.3 | 6.9% |
| 4 | 2.5 | 0.8 | 3.1% |
| 5 | 3.6 | 0.8 | 4.5% |
| 6 | 4.5 | 0.8 | 5.9% |
| 7 | 2.5 | 1.25 | 2.2% |
| 8 | 3.8 | 1.25 | 4.2% |
| 9 | 4.8 | 1.25 | 5.2% |

Referring to Table 1, Samples 1, 4, and 7, having δL/T of less than 3.5%, were found to show relatively low capacitance loss of less than 4.2%, while Samples 2, 3, 5, 6, 8, and 9, having δL/T of 3.5% or higher, were found to show relatively high capacitance loss of 4.2% or higher.

Accordingly, a certain level of capacitance can be secured when δL/T is less than 3.5%.

Table 2 shows the results of high-temperature high-humidity load tests carried out by varying an average value of L. The high-temperature high-humidity load tests were carried out by performing biased humidity tests on 400 samples of each Sample for 48 hours at 3 VR, 85° C., and 85% RH. Here, if even a single sample did not pass the test, the corresponding Sample was evaluated as a fail.

TABLE 2

| Sample # | Average L(μm) | Evaluation |
|---|---|---|
| 1 | 28 | Fail |
| 2 | 41 | Fail |
| 3 | 48 | Pass |
| 4 | 60 | Pass |
| 5 | 73 | Pass |

Referring to Table 2, a fail occurred in Sample 1 having an average L value of 28 and in Sample 2 having an average L value of 41, while in Samples 3-5 having an average L value of 48 or greater, no fail occurred. Accordingly, a preferable average value of L capable of ensuring humidity resistance was 48 or greater.

As conventional multilayer capacitors in automotive applications have become increasingly smaller in size while having higher capacitance, dielectric layers are becoming thinner, so in an event of step portion formation, reliability drastically degrades, and such critical drawbacks were inevitably more apparent in IT products.

According to the present exemplary embodiment, the first internal electrode 121 may be exposed through the third, fifth, and sixth external surfaces 3, 5, and 6 of the capacitor body 110, and the second internal electrode 122 may be exposed through the fourth, fifth, and sixth external surfaces 4, 5, and 6 of the capacitor body 110, thus increasing capacitance of the multilayer capacitor 100.

Also, the first and second side portions 151 and 152 are disposed on the fifth and sixth external surfaces 5 and 6 of the capacitor body 110, respectively, and respectively disposed in contact with opposite side ends of the first and second internal electrodes, wherein δL/T<3.5% is satisfied, where L is a thickness of the first or second side portion 151 or 152 in direction Y, taken at a level at which the first or second internal electrode 121 or 122 is disposed, δL is a difference between a maximum L value and a minimum L value, and T is a length of the first or second side portion 151 or 152 in a direction perpendicular to the first and second internal electrodes 121 and 122. Accordingly, degradation in capacitance and reliability of the multilayer capacitor may be prevented.

As set forth above, according to the embodiments in the present disclosure, a multilayer capacitor may have an improved capacitance and a certain guaranteed level of humidity resistance in a high-temperature environment.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multilayer capacitor comprising:
a capacitor body including a plurality of dielectric layers and a plurality of first and second internal electrodes alternately disposed with a dielectric layer interposed therebetween, and having first and second surfaces opposing each other, third and fourth surfaces connected to the first and second surfaces and opposing each other, and fifth and sixth surfaces connected to the first and second surfaces, connected to the third and fourth surfaces, and opposing each other, wherein the first internal electrode is exposed through the third, fifth, and sixth surfaces, and the second internal electrode is exposed through the fourth, fifth, and sixth surfaces;
first and second side portions each having varying thickness and respectively disposed on the fifth and sixth surfaces of the capacitor body; and
first and second external electrodes disposed on the third and fourth surfaces of the capacitor body, respectively,
wherein the first and second external electrodes include:
first and second sintered electrodes disposed in contact with end portions of the first and second internal electrodes, respectively; and
first and second conductive resin electrodes disposed on external surfaces of the first and second sintered electrodes, respectively,
wherein δL/T<3.5% is satisfied, where L is a varying thickness of the first or second side portion, taken at a level at which the first or second internal electrode is disposed along a flat portion of the fifth and sixth surfaces, δL is a difference between a maximum L value and a minimum L value, and T is a length of the first or second side portion in a first direction perpendicular to a second direction at which the first or second internal electrode extends.

2. The multilayer capacitor of claim 1, wherein an average value of L is greater than or equal to 48 μm.

3. The multilayer capacitor of claim 1, wherein the first internal electrode is exposed through a first corner portion formed by connecting the third surface and the fifth surface of the capacitor body and through a second corner portion formed by connecting the third surface and the sixth surface of the capacitor body, and
wherein the second internal electrode is exposed through a third corner portion formed by connecting the fourth surface and the fifth surface of the capacitor body and through a fourth corner portion formed by connecting the fourth surface and the sixth surface of the capacitor body.

4. The multilayer capacitor of claim 1, wherein an average thickness of the first and second internal electrodes in the first direction perpendicular to the second direction at which the first or second internal electrode extends is less than 1 μm.

5. The multilayer capacitor of claim 4, wherein an average thickness of the dielectric layers in the first direction perpendicular to the second direction at which the first or second internal electrode extends is less than three times an average thickness of the first and second internal electrodes in the first direction perpendicular to the second direction at which the first or second internal electrode extends.

6. The multilayer capacitor of claim 1, wherein an average thickness of the dielectric layers in the first direction perpendicular to the second direction at which the first or second internal electrode extends is less than three times an average thickness of the first and second internal electrodes in the first direction perpendicular to the second direction at which the first or second internal electrode extends.

7. The multilayer capacitor of claim 1, wherein a distance from the third surface of the capacitor body to an end portion of the first conductive resin electrode is greater than a distance from the third surface of the capacitor body to an end portion of the first sintered electrode.

8. The multilayer capacitor of claim 7, wherein the first and second external electrodes are further disposed on the first and second side portions on the fifth and sixth surfaces of the capacitor body, respectively, and wherein a distance from the third surface of the capacitor body to an end portion of the first conductive resin electrode disposed on the fifth or sixth surface is greater than a distance from the third surface of the capacitor body to an end portion of the first sintered electrode disposed on the fifth or sixth surface.

9. The multilayer capacitor of claim 1, wherein a distance from the fourth surface of the capacitor body to an end portion of the second conductive resin electrode is greater than a distance from the fourth surface of the capacitor body to an end portion of the second sintered electrode.

10. The multilayer capacitor of claim 9, wherein the first and second external electrodes are further disposed on the first and second side portions in the fifth and sixth surfaces of the capacitor body, respectively, and wherein a distance from the fourth surface of the capacitor body to an end portion of the second conductive resin electrode disposed on the fifth or sixth surface is shorter than a distance from the fourth surface of the capacitor body to an end portion of the second sintered electrode disposed on the fifth or sixth surface.

11. The multilayer capacitor of claim 1, wherein the first and second external electrodes disposed on the third and fourth surfaces of the capacitor body, respectively, include first and second connection portions, respectively, and include first and second band portions, respectively, and wherein the first and second connection portions are disposed in contact with the first and second internal electrodes, respectively, and the first and second band portions extend from the first and second connection portion onto portions of the first and second surfaces of the capacitor body, respectively.

12. The multilayer capacitor of claim 1, wherein the first and second external electrodes disposed on the third and fourth surfaces of the capacitor body, respectively, include first and second connection portions, respectively, and include first and second band portions, respectively, and wherein the first and second connection portions are disposed in contact with the first and second internal electrodes, respectively, and the first and second band portions extend from the first and second connection portion onto portions of the first and second surfaces of the capacitor body, respectively and portions of the fifth and sixth surfaces of the capacitor body.

13. The multilayer capacitor of claim 1, wherein the first and second external electrodes further include first and second plating layers, respectively, and wherein the first and second plating layers cover external surfaces of the first and second conductive resin electrodes, respectively.

14. The multilayer capacitor of claim 13, wherein the first and second plating layers include first and second nickel layers, respectively, and include first and second tin layers, respectively, and wherein the first and second nickel layers cover external surfaces of the first and second conductive resin electrodes, respectively, and the first and second tin layers cover external surfaces of the first and second nickel layers, respectively.

* * * * *